United States Patent Office 3,369,014
Patented Feb. 13, 1968

3,369,014
POLYETHERS CO-INITIATED BY SUCROSE AND SORBITOL AND URETHANE RESINS THEREFROM
Robert E. Booth, Syracuse, N.Y., assignor to Allied Chemical Corporation, New York, N.Y., a corporation of New York
No Drawing. Continuation-in-part of application Ser. No. 286,523, June 10, 1963. This application Sept. 13, 1966, Ser. No. 578,960
2 Claims. (Cl. 260—209)

ABSTRACT OF THE DISCLOSURE

The present invention relates to novel polyether compositions and methods for preparing them wherein the polyethers are characterized by a hydroxyl number of 350 and 600 and are prepared by reacting propylene oxide with a mixture of sucrose and sorbitol, wherein the ratio of sucrose to sorbitol in the reaction mixture is in the range of 0.5 to 2 mols sucrose per mol of sorbitol, at a temperature within the range of 100 to 110° C. and continuing the introduction of the propylene oxide into the mixture of sucrose and sorbitol while maintaining the temperature of the mixture between 90° C. and 110° C. until the hydroxyl number of the polyether reaction product is in the range of 350 to 600.

---

This application is a continuation-in-part of application Ser. No. 286,523 filed June 10, 1963, now abandoned.

Sucrose, because of its inherent structure namely eight hydroxyl groups per molecule, i.e. high functionality, and its availability in highly purified form at low cost, would appear to be a good initiator for the production of polyethers for use in the manufacture of rigid foam. In fact, however, sucrose polyether prepared by reaction of sucrose with propylene oxide when used alone in foam formulations with diisocyanate results in an unsatisfactory rigid foam, because of its extremely brittle and powdering characteristics. The use of sucrose as an initiator involves further complications.

More specifically, the literature mentions a melting point for sucrose of 186° C., but it is not a true melting point in the sense that a single sample of the subject material will melt and freeze repeatedly as its temperature is raised or lowered past this point. Sucrose melts only with decomposition, evidenced by severe darkening, even charring, and the melt will not freeze upon cooling to the original crystalline form of sucrose. "Molten" sucrose cools to a caramel-like substance that can be shown by chemical examination to be a mixture of many carbohydrate materials and decomposition products. This caramel has a high content of aldose sugars, characterized by an internal cyclic acetal structure, formed by cleavage of the original larger sucrose molecule. This structure interferes with the addition of propylene oxide, even to hydroxyl groups elsewhere in the molecule where one would expect it to add. This is easily shown in the case of pure aldose sugars, for example, glucose.

In an effort to overcome the aforementioned problem, inert liquid mediums have been suggested for incorporation with the sucrose but these not only reduced the capacity but also created another problem involving separation of the inert material from the resultant polyether. In another attempt water was added to the sucrose to form an aqueous sucrose solution and into this solution propylene oxide was introduced to form the polyether. The presence of water however lowers the functionality, i.e. number of hydroxyl groups per molecule in the resultant product, because the polyether derived from reaction of water with propylene oxide has a functionality of 2, thus reducing the average functionality of the product (sucrose has a functionality of eight, i.e. there are eight hydroxyl groups per molecule). High functionality is important because good dimensional stability of rigid urethane foam (freedom from swelling under hot and/or humid conditions) is demanded by the industry and improves with increased functionality of the polyether.

An object of the present invention is to provide a polyether composition having a high functionality of at least 7 eminently suitable for producing rigid foams with excellent dimensional stability. Another object is to provide a novel method for preparing a polyether composition of high functionality of at least 7 in which sucrose is a reactant. A further object is to provide rigid cellular urethanes of good dimensional stability by reaction of organic polyisocyanates with the polyethers of high functionality. Other objects and advantages will be apparent from the following description.

In accordance with the present invention a polyether composition of high functionality may be prepared by introducing propylene oxide into a mixture of sucrose and sorbitol at a temperature within the range of 100–120° C., preferably 100–110° C., continuing introduction of propylene oxide into said mixture of sucrose and sorbitol while maintaining the temperature of said mixture between 80 and 120° C. preferably 90–110° C. to effect reaction of the propylene oxide with the sucrose and sorbitol until the hydroxyl number of said polyether reaction composition is in the range of 350 to 600, preferably 450 to 500, said sucrose and sorbitol in the reaction mixture being in the proportion of 0.5 to 2 mols sucrose per mol of sorbitol preferably 0.75 to 1.4 mols sucrose per mol of sorbitol, and discontinuing the introduction of propylene oxide when the polyether composition reaction product has reached a hydroxyl number within the desired range of 350 to 600. The polyether composition is a normally liquid product of high functionality in excess of 7 and upon reaction with diisocyanate formulation for producing foam results in a rigid foam of excellent dimensional stability.

The preparation of the polyether composition of the present invention may be conveniently carried out by introducing the sorbitol and sucrose initiators into a reaction vessel equipped with a suitable mechanical stirrer to insure dispersion of the sucrose throughout the body of sorbitol. The initiators are then heated to a minimum temperature of 100° C. Initial temperatures below 100° C. should be avoided because of difficulties in operation. Propylene oxide is then introduced into the body of sorbitol and sucrose wherein it reacts with the hydroxyl groups of the sorbitol and sucrose to form polyethers. Later, when initiation (addition of propylene oxide) is well under way, i.e. about 20% or more of the propylene oxide reacted, low temperatures e.g. 80° C. are permissible. Temperatures below 80° C. should not be employed because of uneconomic reaction rates. Temperatures substantially above 120° C. should be avoided because such higher temperatures cause deeper colored products due to sucrose decomposition.

The operation may be conducted at atmospheric, superatmospheric or subatmospheric pressure but for convenience and economy is conducted under substantially atmospheric pressure or low pressures such as about 1 to 20 p.s.i.g. The reactants need not be introduced into the reaction vessel simultaneously but if desired the sorbitol may be first introduced into the reaction vessel, heated to 100° C. and then sucrose gradually added while simultaneously introducing propylene oxide. The proportion of sucrose to sorbitol is important for the reason that a ratio greater than 2 mols sucrose per mol of sorbitol results in unmanageable viscosity difficulties in the operation and ratios below 0.5 mol of sucrose per mol of sorbitol give a polyether composition which when reacted with isocyanate formulations for production of rigid foam produce a foam having excessive primary shrinkage and poor dimensional stability. Consequently the ratio of sucrose to sorbitol should be within the range of 0.5 to 2 mols sucrose preferably 0.75 to 1.4 mols per mol of sorbitol. Another factor of importance in obtaining a good polyether composition for production of stable foam is the hydroxyl number which should be within the range of 350 to 600 preferably 450 to 500. This can be readily controlled by regulating the amount of propylene oxide introduced into the sucrose-sorbitol mixture. The reaction of the propylene oxide with the mixture of sucrose and sorbitol is carried out in the presence of a small amount generally less than 1%, usually about one-tenth to five-tenths percent by weight of the reactants of an alkali metal hydroxide preferably potassium hydroxide. The alkali metal hydroxide catalyst is preferably added in solid form but may also be added as an aqueous solution. Although minor amounts of water i.e. an amount less than one-half percent preferably less than one-quarter of a percent by weight of the polyether composition may be incorporated in the reaction mixture, amounts of water in excess of this quantity should be avoided as it materially affects the functionality of the resultant product.

Rigid foams are prepared by reacting an aromatic isocyanate with the polyether composition of the present invention in the presence of various adjuvants such as blowing agents, activators or catalysts, acid dispersing agents or emulsifiers as is now conventional practice. The foams can be made by the one-shot technique using either a volatile fluorocarbon or carbon dioxide generated by the reaction of water with diisocyanate as the blowing agent. The foams can also be produced by the quasi prepolymer technique wherein a quasi prepolymer is first prepared by reaction of isocyanate with a portion of the polyether and this quasi prepolymer subsequently admixed with additional polyether and adjuvants to form the foam.

A wide variety of polyisocyanates and prepolymers thereof may be used in preparing the cellular urethanes of our invention. Liquid organic polyisocyanates and especially liquid aromatic diisocyanates are preferred. Among examples of suitable polyisocyanates are the following:

m-phenylene diisocyanate
2,4-tolylene diisocyanate
2,6-tolylene diisocyanate
napthalene-1,5-diisocyanate
methylene-bis(4-cyclohexylisocyanate)
methylene-bis(4-phenylisocyanate)
1,6-hexamehylene diisocyanate
4,4',4''-triphenylmethane triisocyanate
1,3,5-benzene triisocyanate Mixtures of the above polyisocyanates and equivalent compounds or compositions may also be used in my invention.

Suitable blowing agents are well-known in the art, but I prefer to use a low-boiling fluorinated aliphatic saturated hydrocarbon. Examples of these blowing agents include:

trichloromonofluoromethane
dichlorodifluoromethane
monochlorotrifluoromethane
dichlorotetrafluoroethane
tetrachlorodifluoroethane
1,1-difluoroethane
1,1,1-monochlorodifluoroethane Mixtures of these compounds and equivalent compounds may also be used in my invention.

The blowing agents are characterized by being liquids or gases at normal temperatures and pressures, having poor solvent power for the organic polymer and boiling at or below temperatures generated by the polymerization reaction, usually not in excess of about 175° C. The agents preferably have significant solubility in the polyisocyanate component and, when in the gaseous state, have a molecular size such that they do not diffuse readily through the interstices of the polymer molecules at ambient temperatures. The amount of blowing agent may vary from about 2% up to 40% or more by weight of the polyether.

The catalyst, accelerator or activator is used to promote or otherwise regulate the reaction between the polyisocyanate and the polyether. Tertiary amines such as triethylamine, dimethylethanolamine, pyridine, quinoline, N-alkyl morpholines and the like are conventionally used. Tin salts such as dibutyl tin dilaurate, tributyl tin octanoate, bis-(2-ethylhexyl)tin oxide, dibutyl tin dichloride, tin hexanoate, stannous octoate and the like may be used alone or in conjunction with the above-described tertiary amines. The amount of catalyst used may range from about 2 to 12 percent or more by weight based on the weight of the polyether. The catalyst can be introduced at any desired time although it is generally added to the polyether component prior to reaction thereof with the polyisocyanate component.

If desired, emulsifying agents may be used to improve the intermixing of the polyether and polyisocyanate components which are usually mutually insoluble. The polymerization reaction may be assisted by vigorous agitation and also by use of these emulsifying agents. Any of a number of known emulsifying agents can be used. I prefer, however, to employ siloxane-oxyalkylene block copolymers which have the general formula

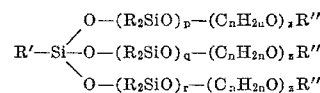

in which R, R' and R'' are $C_{1-8}$ alkyl radicals, $p$, $q$ and $r$ are integers ranging from 2 to 15 and —$(C_nH_{2n}O)_z$— is a polyalkylene block which is preferably a polyoxyethylene-polyoxypropylene block containing from 10 to 50 of each oxyalkylene unit. These siloxane-oxyalkylene block polymers are commercially available, one such being marketed under the trade designation "Silicone L-520" in which, referring to the general formula above, R=$CH_3$, R'=$C_2H_5$, R''=$C_4H_9$, $p$, $q$ and $r$=7 and the block $(C_nH_{2n}O)_z$ is a polyoxyethylene-polyoxypropylene block containing 50 units of each oxyalkylene moiety. Other emulsifying agents suitable for use in the invention include polyethylene phenol ether, blends of polyalcohol carboxylic acid ester, oil-soluble sulfonates and the like.

If desired, the flame retardency of the cellular urethane products of this invention can be implemented by use of known flame retardant agents. Such agents, as is known, may or may not contain groups which are reactive with polyisocyanates. In the former instance, the amount of polyisocyanate used should be adjusted to accommodate the reactive group. Representative of these fire retardants are:

(1) Non-reactive agents:
    antimony trioxide
    tris(chloroethyl)phosphate
    tris(2,3-dichloropropyl)phosphate
    tris(2,3-dibromopropyl)phosphate
    bis(beta chloroethyl)vinyl phosphate (2) Reactive agents:
    chlorinated diphenol
    2-hydroxyethyl phosphite The polymerization ingredients and additives can be mixed in various ways depending upon the type product desired. Generally the polyether together with catalyst, emulsifying agent and other adjuvants are premixed and then added together with a solution of the polyisocyanate and blowing agent to a mixing apparatus. The amount of polyether and polyisocyanate employed may vary over a wide range. Preferably the polyether is reacted with an amount in excess of an equimolar quantity of the polyisocyanate. If desired, the blowing agent can be introduced into the "premix" rather than the polyisocyanate. Further, the polyisocyanate can be prereacted with a portion of the polyether to form a quasi prepolymer. The latter is added to a premix comprising the balance of the polyether and other adjuvants. The mixture is thoroughly agitated, preferably at room temperature, to insure the blending of the reactants and is then poured or otherwise introduced into a suitable mold and permitted to form freely therein. The foam is then allowed to set at ambient temperature or "cured" by placing the foam in a heated enclosure for a predetermined period dependent upon the requirements of the particular system employed.

The follownig examples illustrate the present invention.

EXAMPLE I 3385 g. Sorbitol and 100 g. KOH (catalyst) were melted together in a columnar cyclic reactor. Propylene oxide addition, through the bottom of the reactor, was begun at 100° C., providing agitation for the mixture. Simultaneously, sucrose addition was made through the top of the reactor, 4651 g. sucrose being added over a one-hour period. Addition of propylene oxide was continued at 100° C. until 25,769 g. polyether had been made, using 17,633 g. propylene oxide. The cured polyether was stripped of volatiles by a nitrogen purge for 1 hour at 100° C. The cooled (25–30° C.) crude was acidified to a pH of 5.0 with 220 ml. 25% aqueous HCl, digested (agitated) 3 hours at 25° C., diluted with 2 volumes of acetone, and filtered of precipitated salts. 2,6-di-tert-butyl-4-methylphenol (52 g.) was added to the filtrate solution. Acetone was evaporated at 100° C. and reduced pressure, and the recovered polyether was stripped of traces of volatiles by a nitrogen purge for two hours at 110° C.

Analysis:
　Hydroxyl Number (mg. KOH/g.) _____ 463
　pH _____ 5.4
　Water _____percent__ 0.06
　Viscosity (cps. at 25° C.) _____ 78,200
　Acid Number (mg. KOH/g.) _____ 0.12

This polyether has 49 equivalent percent octol and 51 equivalent percent hexol, calculated from the weights of sucrose, sorbitol, the total batch and the hydroxyl number. Average functionality: 7.

EXAMPLE II

A rigid urethane foam was prepared of this polyether: 120 g. polyether was mixed with 1.2 g. of silicone emulsifier, 0.5 g. dibutyl tin dilaurate and 1.2 g. of dimethylethanolamine. When this mixture was completely homogeneous, 31.0 g. trichloro-fluoromethane was added, and the mixture again agitated until homogeneous. This mixture was agitated at 2400 r.p.m., 106.8 g. tolylene diisocyanate was quickly added, and 50 seconds later, the mixture was poured into a 8″ x 8″ mold. Two minutes later it had finished rising, giving a rigid foam bun 8″ x 8″ x 6″, which was cured by standing at room temperature 24 hours. Tests on the foam showed the following properties:

Density _____lb./ft.$^3$__ 2.0
Primary shrinkage _____percent__ [1] 0
Appearance:
　Surface _____ Very good
　Cell size _____ Very good
Penetration _____ [2] 130
Dimensional stability, (24 hr. at 70° C., 100% relative humidity) _____percent__ [3] 5

[1] Primary shrinkage—Dimensional loss during cure.
[2] Penetration—Score denotes foams' toughness, resistance to compression, and freedom from friability. Scores of 130 and above are good.
[3] Dimensional stability—Volume increase (swelling) during test; as much as 10% is acceptable; 4–5% is very good.

Several other sucrose-sorbitol co-initiated polyethers, and their foams, were prepared by the above described process. All pertinent data are recorded in Table I.

Although certain preferred embodiments of the invention have been disclosed for purposes of illustration it will be evident that various changes and modifications may be made therein without departing from the scope and spirit of the invention.

TABLE I

| | Polyether | | | | | | | | | |
|---|---|---|---|---|---|---|---|---|---|---|
| | Preparation | | | | Analyses | | | | | |
| Ex. | Wt. of Sucrose (grams) | Wt. of Sorbitol (grams) | Wt. of Propylene Oxide (grams) | Wt. of KOH (grams) | Hydroxyl No. (mg. KOH/g.) | Octol: Hexol Equiv. Ratio | Viscosity (cps. at 25° C.) | pH (3:1 MeOH:H$_2$O) | Water (wt. percent) | Acid No. (mg.KOH/g.) |
| 3 | 6,679 | 2,031 | 17,639 | 100 | 446 | 70–30 | 61,500 | 8.1 | 0.15 | 0.01 |
| 4 | 4,651 | 3,335 | 17,633 | 100 | 463 | 50–50 | 78,200 | 5.4 | 0.06 | 0.12 |

| | Foam | | | | | |
|---|---|---|---|---|---|---|
| | Formulation, pts. by wt. | | | | | |
| Example | Polyether | Tolylene Diisocyanate | Silicone Emulsifier | Dibutyltin-Dilaurate | Trichloro-Fluoromethane | DMEA |
| 3 | 100 | 85.5 | 1.0 | 0.4 | 22.6 | 1.0 |
| 4 | 100 | 89.2 | 1.0 | 0.4 | 23.0 | 1.0 |

| | Foam | | | | | |
|---|---|---|---|---|---|---|
| | Properties | | | | | |
| Example | Density, lb./ft.$^3$ | Prim. Shrink. (percent vol. decrease) | Appearance | | | Penetration | Dim. Stab. (percent vol. increase) |
| | | | Surface | Cell Size | Cell Uniform | | |
| 3 | 2.0 | 0 | V. good | V. good | V. good | 130 | 4 |
| 4 | 2.0 | 0 | ___do___ | Good | Good | 130 | 5 |

I claim:
1. A polyether composition of high functionality obtained by introducing propylene oxide into a mixture of sucrose and sorbitol at a temperature within the range of 100–120° C., continuing introduction of propylene oxide into said mixture of sucrose and sorbitol while maintaining the temperature of said mixture between 80 and 120° C. to effect reaction of the propylene oxide with the sucrose and sorbitol until the hydroxyl number of said polyether reaction composition is in the range of 350 to 600, said sucrose and sorbitol in the reaction mixture being in the proportion of 0.5 to 2 mols sucrose per mol of sorbitol, and discontinuing the introduction of propylene oxide when the polyether composition reaction product has reached a hydroxyl number within the desired range of 350 to 600.

2. A polyether composition of high functionality obtained by introducing propylene oxide into a mixture of sucrose and sorbitol at a temperature within the range of 100–110° C., continuing introduction of propylene oxide into said mixture of sucrose and sorbitol while maintaining the temperature of said mixture between 90 and 110° C. to effect reaction of the propylene oxide with the sucrose and sorbitol until the hydroxyl number of said polyether reaction composition is in the range of 450 to 500, said sucrose and sorbitol in the reaction mixture being in the proportion of 0.75 to 1.4 mols sucrose per mol of sorbitol, and discontinuing the introduction of propylene oxide when the polyether composition reaction product has reached a hydroxyl number within the desired range of 450 to 500.

References Cited

UNITED STATES PATENTS

| | | | |
|---|---|---|---|
| 3,167,538 | 1/1965 | Kaiser et al. | 260—210 |
| 3,169,934 | 2/1965 | Dennett et al. | 260—209 |
| 3,277,076 | 10/1966 | Yotsuzuka et al. | 260—209 |

LEWIS GOTTS, *Primary Examiner.*

J. R. BROWN, *Assistant Examiner.*